(12) United States Patent
Monros

(10) Patent No.: US 9,316,164 B2
(45) Date of Patent: Apr. 19, 2016

(54) MICROCONTROLLER FOR POLLUTION CONTROL SYSTEM FOR AN INTERNAL COMBUSTION ENGINE

(71) Applicant: Serge V. Monros, Santa Ana, CA (US)

(72) Inventor: Serge V. Monros, Santa Ana, CA (US)

( * ) Notice: Subject to any disclaimer, the term of this patent is extended or adjusted under 35 U.S.C. 154(b) by 331 days.

(21) Appl. No.: 14/156,189

(22) Filed: Jan. 15, 2014

(65) Prior Publication Data

US 2014/0207360 A1    Jul. 24, 2014

Related U.S. Application Data

(60) Provisional application No. 61/754,384, filed on Jan. 18, 2013.

(51) Int. Cl.
| | |
|---|---|
| *F02B 25/06* | (2006.01) |
| *F02D 41/00* | (2006.01) |
| *G06F 17/30* | (2006.01) |
| *F01M 13/02* | (2006.01) |
| *F01M 13/00* | (2006.01) |

(52) U.S. Cl.
CPC ......... *F02D 41/0025* (2013.01); *F01M 13/023* (2013.01); *G06F 17/30867* (2013.01); *F01M 2013/0022* (2013.01); *F02D 2250/08* (2013.01)

(58) Field of Classification Search
CPC .......... F01M 13/00; F01M 2013/0005; F01M 2013/0055; F01M 2013/0088
USPC .................................. 123/572–574; 701/102
See application file for complete search history.

(56) References Cited

U.S. PATENT DOCUMENTS

| | | | |
|---|---|---|---|
| 2004/0089264 A1 | 5/2004 | Kabat et al. | |
| 2008/0058994 A1* | 3/2008 | Tsuda | F02D 41/18 700/282 |
| 2010/0076664 A1* | 3/2010 | Monros | F01M 13/00 701/102 |
| 2010/0180872 A1* | 7/2010 | Monros | F01M 13/00 123/573 |
| 2010/0192925 A1 | 8/2010 | Sadakane | |
| 2013/0213370 A1* | 8/2013 | Shirabe | F01M 5/002 123/574 |
| 2014/0096754 A1* | 4/2014 | Monros | F01M 13/0011 123/574 |
| 2015/0345349 A1* | 12/2015 | Monros | F01M 13/0011 123/574 |

OTHER PUBLICATIONS

International Search Report and Written Opinion dated Dec. 9, 2014 for the International Application No. PCT/US2014/011721.

* cited by examiner

*Primary Examiner* — John Kwon
(74) *Attorney, Agent, or Firm* — Kelly & Kelley, LLP

(57) ABSTRACT

A pollution control system for an internal combustion engine includes a microcontroller and a power supply, a plurality of sensors configured to measure operating parameters of the engine, and a PCV valve responsive to a control signal from the microcontroller and configured to regulate a flow rate of blow-by gasses in the engine. The microcontroller includes programmable flash memory connected to a control processor, a power supply input, a sensor input configured to receive data from an engine sensor, and a signal output configured to transmit a signal from the control processor so as to control operation of a PCV valve regulating a flow rate of blow-by gasses in the engine.

14 Claims, 5 Drawing Sheets

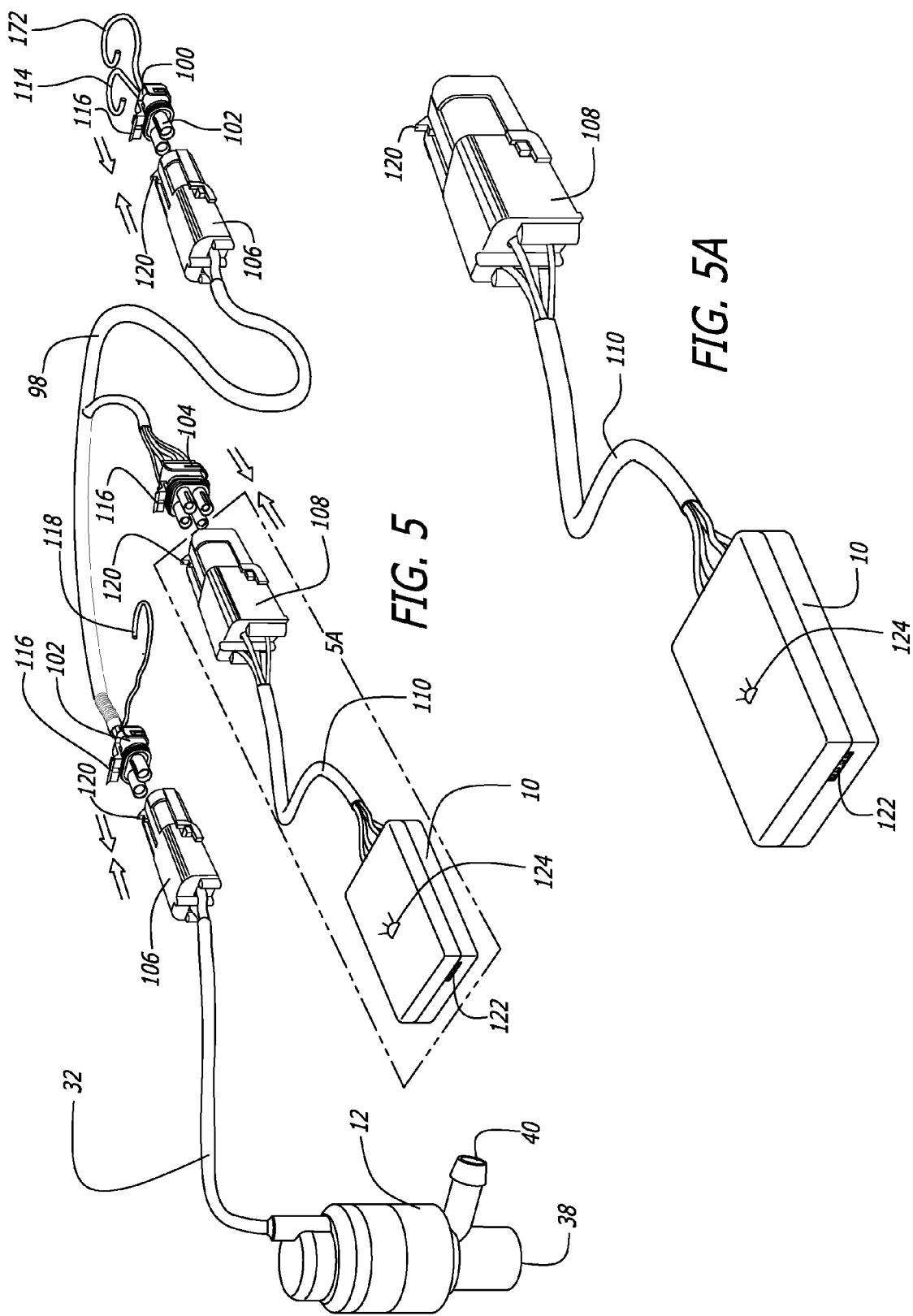

MICROCONTROLLER FOR POLLUTION CONTROL SYSTEM FOR AN INTERNAL COMBUSTION ENGINE

FIELD OF THE INVENTION

The present invention generally relates to pollution control systems. More particularly, the present invention relates to a microcontroller for a pollution control system, for an internal combustion engine.

BACKGROUND OF THE INVENTION

Basic operation of standard internal combustion (IC) engines varies based on the type of combustion process, the quantity of cylinders and the desired use/functionality. For instance, in a traditional two-stroke engine, oil is pre-mixed with fuel and air before entry into the crankcase where the oil/fuel/air mixture is ignited. In a gasoline engine, fuel is pre-mixed with only air, but is then compressed and ignited by a spark plug that causes the fuel to burn. In a diesel engine, fuel and air are pre-mixed but as there is no spark plug to provide ignition, the fuel/air mixture is ignited by compression in the piston shaft. In each type of IC engine, following fuel ignition, the piston is then pushed downwardly and the exhaust fumes are allowed to exit the cylinder when the piston exposes the exhaust port. The movement of the piston pressurizes the remaining oil/fuel in the crankcase and allows additional fresh oil/fuel/air to rush into the cylinder, thereby simultaneously pushing the remaining exhaust out the exhaust port.

Momentum drives the piston back into the compression stroke as the process repeats itself.

In a diesel or gasoline powered engine, as opposed to a two-stroke engine, oil lubrication of the crankshaft and connecting rod bearings is separate from the fuel/air mixture. In a diesel or gasoline powered engine, the crankcase is filled mainly with air and oil. It is the intake manifold that receives and mixes fuel and air from separate sources. The fuel/air mixture in the intake manifold is drawn into the combustion chamber where it is ignited by the spark plugs (in a gasoline engine) and burned. There are no spark plugs in a diesel engine, so ignition in a diesel engine occurs as a result of compression in the piston shaft. The combustion chamber, in both gasoline and diesel engines, is largely sealed off from the crankcase by a set of piston rings that are disposed around an outer diameter of the pistons within the piston cylinder. This keeps the oil in the crankcase rather than allowing it to burn as part of the combustion stroke. Unfortunately, the piston rings are unable to completely seal off the piston cylinder. Consequently, small amounts of crankcase oil intended to lubricate the cylinder are instead drawn into the combustion chamber and burned during the combustion process. This is true in both gasoline and diesel powered engines. Additionally, combustion waste gasses comprising unburned fuel and exhaust gases in the combustion chamber simultaneously pass the piston rings and enter the crankcase. The waste gas entering the crankcase is commonly called "blow-by" or "blow-by gas".

Blow-by gases mainly consist of contaminants such as hydrocarbons (unburned fuel), carbon dioxide or water vapor, all of which are harmful to the engine crankcase. The quantity of blow-by gas in the crankcase can be several times that of the concentration of hydrocarbons in the intake manifold. Simply venting these gases to the atmosphere increases air pollution. Alternatively, trapping the blow-by gases in the crankcase allows the contaminants to condense and accumulate over time in the engine crankcase. Condensed contaminants form corrosive acids and sludge in the interior of the crankcase. This decreases the ability of the engine oil in the crankcase to lubricate the cylinder and crankshaft. Degraded oil that fails to properly lubricate the crankshaft components (e.g. the crankshaft and connecting rods) can be a factor in increased wear and tear in the engine, as well as poor engine performance. Inadequate crankcase lubrication contributes to unnecessary wear on the piston rings which simultaneously reduces the quality of the seal between the combustion chamber and the crankcase. As the engine ages, the gaps between the piston rings and cylinder walls increase resulting in larger quantities of blow-by gases entering the crankcase. Too much blow-by gases entering the crankcase can cause power loss and even engine failure. Moreover, condensed water in the blow-by gases can cause engine parts to rust. Hence, crankcase ventilation systems were developed to remedy the existence of blow-by gases in the crankcase. In general, crankcase ventilation systems expel blow-by gases out of a positive crankcase ventilation (PCV) valve and into the intake manifold to be re-burned.

The PCV valve recirculates (i.e. vents) blow-by gases from the crankcase back into the intake manifold to be burned again with a fresh supply of air/fuel during combustion. This is particularly desirable as the harmful blow-by gases are not simply vented to the atmosphere. A crankcase ventilation system should also be designed to limit, or ideally eliminate, blow-by gas in the crankcase to keep the crankcase as clean as possible. Early PCV valves comprised simple one-way check valves. These PCV valves relied solely on pressure differentials between the crankcase and intake manifold to function correctly. When a piston travels downward during intake, the air pressure in the intake manifold becomes lower than the surrounding ambient atmosphere. This result is commonly called "engine vacuum". The vacuum draws air toward the intake manifold. Accordingly, air is capable of being drawn from the crankcase and into the intake manifold through a PCV valve that provides a conduit in-between the crankcase and intake manifold. The PCV valve basically opens a one-way path for blow-by gases to vent from the crankcase back into the intake manifold. In the even the pressure difference changes (i.e. the pressure in the intake manifold becomes relatively higher than the pressure in the crankcase), the PCV valve closes and prevents gases from exiting the intake manifold and entering the crankcase. Hence, the PCV valve is a "positive" crankcase ventilation system, wherein gases are only allowed to flow in one direction—out from the crankcase and into the intake manifold. The one-way check valve is basically an all-or-nothing valve. That is, the valve is completely open during periods when the pressure in the intake manifold is relatively less than the pressure in the crankcase. Alternatively, the valve is completely closed when the pressure in the crankcase is relatively lower than the pressure in the intake manifold. One-way check valve-based PCV valves are unable to account for changes in the quantity of blow-by gases that exist in the crankcase at any given time. The quantity of blow-by gases in the crankcase varies under different driving conditions and by engine make and model.

PCV valve designs have been improved over the basic one-way check valve and can better regulate the quantity of blow-by gases vented from the crankcase to the intake manifold. One PCV valve design uses a spring to position an internal restrictor, such as a cone or disk, relative to a vent through which the blow-by gases flow from the crankcase to the intake manifold. The internal restrictor is positioned proximate to the vent at the distance proportionate to the level of engine vacuum relative to spring tension. The purpose of the spring is to respond to vacuum pressure variation between the crankcase and intake manifold. This design is intended to improve on the all-or-nothing one-way check valve. For example, at idle, engine vacuum is high. The spring-biased restrictor is set to vent a large quantity of blow-by gases in view of the large pressure differential, even though the engine is producing a relatively small quantity of blow-by gases. The spring positions the internal restrictor to substantially allow air flow from the crankcase to the intake manifold. During acceleration, the engine vacuum decreases due to an increase in engine load. Consequently, the spring is able to push the internal restrictor back down to reduce the air flow from the crankcase to the intake manifold, even though the engine is producing more blow-by gases. Vacuum pressure then increases as the acceleration decreases (i.e. engine load decreases) as the vehicle moves toward a constant cruising speed. Again, the spring draws the internal restrictor back away from the vent to a position that substantially allows air flow from the crankcase to the intake manifold, based on the pressure differential, because the engine creates more blow-by gases at cruising speeds due to higher engine RPMs. Hence, such an improved PCV valve that solely relies on engine vacuum and a spring-biased restrictor does not optimize the ventilation of blow-by gases from the crankcase to the intake manifold, especially in situations where the vehicle is constantly changing speeds (e.g. city driving or stop and go highway traffic).

One key aspect of crankcase ventilation is that engine vacuum varies as a function of engine load, rather than engine speed, and the quantity of blow-by gases varies, in part, as a function of engine speed, rather than engine load. For example, engine vacuum is higher when engine speeds remain relatively constant (e.g. idling or driving at a constant velocity). Thus, the amount of engine vacuum present when an engine is idling (at say 90° rotations per minute (rpm)) is essentially the same as the amount of vacuum present when the engine is cruising at a constant speed on a highway (for example between 2,500 to 2,800 rpm). The rate at which blow-by gases are produced is much higher at 2,500 rpm than at 900 rpm. But, a spring-based PCV valve is unable to account for the difference in blow-by gas production between 2,500 rpm and 900 rpm because the spring-based PCV valve experiences a similar pressure differential between the intake manifold and the crankcase at these different engine speeds. The spring is only responsive to changes in air pressure, which is a function of engine load rather than engine speed. Engine load typically increases when accelerating or when climbing a hill, for example. As the vehicle accelerates blow-by gas production increases, but the engine vacuum decreases due to the increased engine load. Thus, the spring based PCV valve may vent an inadequate quantity of blow-by gases from the crankcase during acceleration. Such a spring-based PCV valve system is incapable of venting blow-by gases based on blow-by gas production because the spring only responds to engine vacuum.

Maintenance of a PCV valve system is important and relatively simple. The lubricating oil must be changed periodically to remove the harmful contaminants trapped therein over time. Failure to change the lubricating oil at adequate intervals (typically every 3,000 to 6,000 miles) can lead to a PCV valve system contaminated with sludge. A plugged PCV valve system will eventually damage the engine. The PCV valve system should remain clear for the life of the engine assuming the lubricating oil is changed at an adequate frequency.

As part of an effort to combat smog in the Los Angeles basin, California started requiring emission control systems on all model cars starting in the 1960s. The Federal Government extended these emission control regulations nationwide in 1968. Congress passed the Clear Air Act in 1970 and established the Environmental Protection Agency (EPA). Since then, vehicle manufacturers have had to meet a series of graduated emission control standards for the production and maintenance of vehicles. This involved implementing devices to control engine functions and diagnose engine problems. More specifically, automobile manufacturers started integrating electrically controlled components, such as electric fuel feeds and ignition systems. Sensors were also added to measure engine efficiency, system performance and pollution. These sensors were capable of being accessed for early diagnostic assistance.

On-Board Diagnostics (OBD) refers to early vehicle self-diagnostic systems and reporting capabilities. OBD systems provide current state information for various vehicle subsystems. The quantity of diagnostic information available via OBD has varied widely since the introduction of on-board computers to automobiles in the early 1980s. OBD originally illuminated a malfunction indicator light (MIL) for a detected problem, but did not provide information regarding the nature of the problem. Modern OBD implementations use a standardized fast digital communications port to provide real-time data in combination with standardized series of diagnostic trouble codes (DTCs) to establish rapid identification of malfunctions and the corresponding remedy from within the vehicle.

The California Air Resources Board (CARB or simply ARB) developed regulations to enforce the application of the first incarnation of OBD (known now as "OBD-I"). The aim of CARB was to encourage automobile manufacturers to design reliable emission control systems. CARB envisioned lowering vehicle emissions in California by denying registration of vehicles that did not pass the CARB vehicle emission standards. Unfortunately, OBD-I did not succeed at the time as the infrastructure for testing and reporting emissions-specific diagnostic information was not standardized or widely accepted. Technical difficulties in obtaining standardized and reliable emission information from all vehicles led to an inability to effectively implement an annual testing program.

OBD became more sophisticated after the initial implementation of OBD-I. OBD-II was a new standard introduced in the mid 1990s that implemented a new set of standards and practices developed by the Society of Automotive Engineers (SAE). These standards were eventually adopted by the EPA and CARB. OBD-II incorporates enhanced features that provide better engine monitoring technologies. OBD-II also monitors chassis parts, body and accessory devices, and includes an automobile diagnostic control network. OBD-II improved upon OBD-I in both capability and standardization. OBD-II specifies the type of diagnostic connector, pin configuration, electrical signaling protocols, messaging format and provides an extensible list of diagnostic trouble codes (DTCs). OBD-II also monitors a specific list of vehicle parameters and encodes performance data for each of those parameters. Thus, a single device can query the on-board computer(s) in any vehicle. This simplification of reporting diagnostic data led to the feasibility of the comprehensive emissions testing program envisioned by CARB.

A problem exists in that all the diagnostic information coming from the OBD-II system is not being used in order to optimize the performance of the engine; specifically with regard to the PCV valve. Accordingly, there is a need for a microcontroller apparatus and system that utilizes engine diagnostic information in order to optimize performance of the PCV valve thereby reducing engine emissions and pollution. The present invention fulfills these needs and provides other related advantages.

SUMMARY OF THE INVENTION

The present invention is directed to a microcontroller for use in a pollution control system for an internal combustion engine. The microcontroller comprises programmable flash memory connected to a control processor. The power supply input is connected to the memory and the control processor. A sensor input is connected to the control processor, wherein the sensor input is configured to receive data from an engine sensor. A signal output is also connected to the control processor. The signal output is configured to transmit a signal from the control processor so as to control operation of a PCV valve that regulates a flow rate of blow-by gasses in the engine.

In the microcontroller, the control processor is configured to send multiple operating signals through the signal output. A first operating signal is configured to close the PCV valve while the engine is in a cold start state. A cold start state refers to that condition immediately following ignition of the engine when the engine is still heating up to its preferred idle/operation temperature. A second operating signal is configured to open the PCV valve within a window of engine RPMs while the engine is in a warm running state. The warm running state refers to the condition in which the engine has been running for a sufficient period of time that it is heated up to its preferred idle/operation temperature.

A third operating signal is configured to open the PCV valve for a predetermined time interval within a window of engine RPMs, particularly when the engine RPMs are within the window for longer than a predetermined duration. This third operating signal is intended to periodically open and close the PCV valve when the engine RPMs are consistently within the window, such as during prolonged highway driving. This avoids constant recycling of blow-by gasses which can have negative effects on combustion.

The engine sensor is configured to transmit data on different engine parameters including engine RPMs, engine temperature, engine torque, and/or crankcase pressure. The control processor uses the data from the engine sensor to determine the applicable engine state and requirements for opening or closing the PCV valve.

A pollution control system for an internal combustion engine includes a microcontroller electrically connected to a power supply, a plurality of sensors connected to the microcontroller, and a PCV valve electrically connected to the microcontroller. The plurality of sensors are each configured to measure operating parameters of the engine. The PCV valve is configured to regulate a flow rate of blow-by gasses in the engine and is responsive to a control signal from the microcontroller.

The PCV valve is movable between opened and closed positions so as to regulate vacuum pressure in the engine. The plurality of sensors include an engine temperature sensor, a spark plug sensor, a battery sensor, a PCV valve sensor, an engine RPM sensor, an accelerometer sensor or an exhaust gas sensor.

The PCV valve is in fluid communication with a crankcase and an intake manifold on the engine. The microcontroller operates a restrictor within the PCV valve, the restrictor regulating the flow rate of blow-by gasses through the PCV valve, specifically from the crankcase to the intake manifold. The microcontroller regulates the flow rate of blow-by gasses from the crankcase to the intake manifold based upon the quantity of blow-by gasses being produced. The microcontroller determines the quantity of blow-by gasses being produced based upon and analysis of the operating parameters of the engine measured by the sensors.

The microcontroller includes a signal wire, a PCV control wire, and power supply wires. The microcontroller is powered only when an ignition for the engine is on. The microcontroller comprises solid state memory that is programmable and re-programmable.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 5 is a system view of the microcontroller in connection with a PCV valve and a power connection; and FIG. 5A is an enlarged view of the microcontroller with its control wires and connector.

DETAILED DESCRIPTION OF THE PREFERRED EMBODIMENTS

Figure 1:
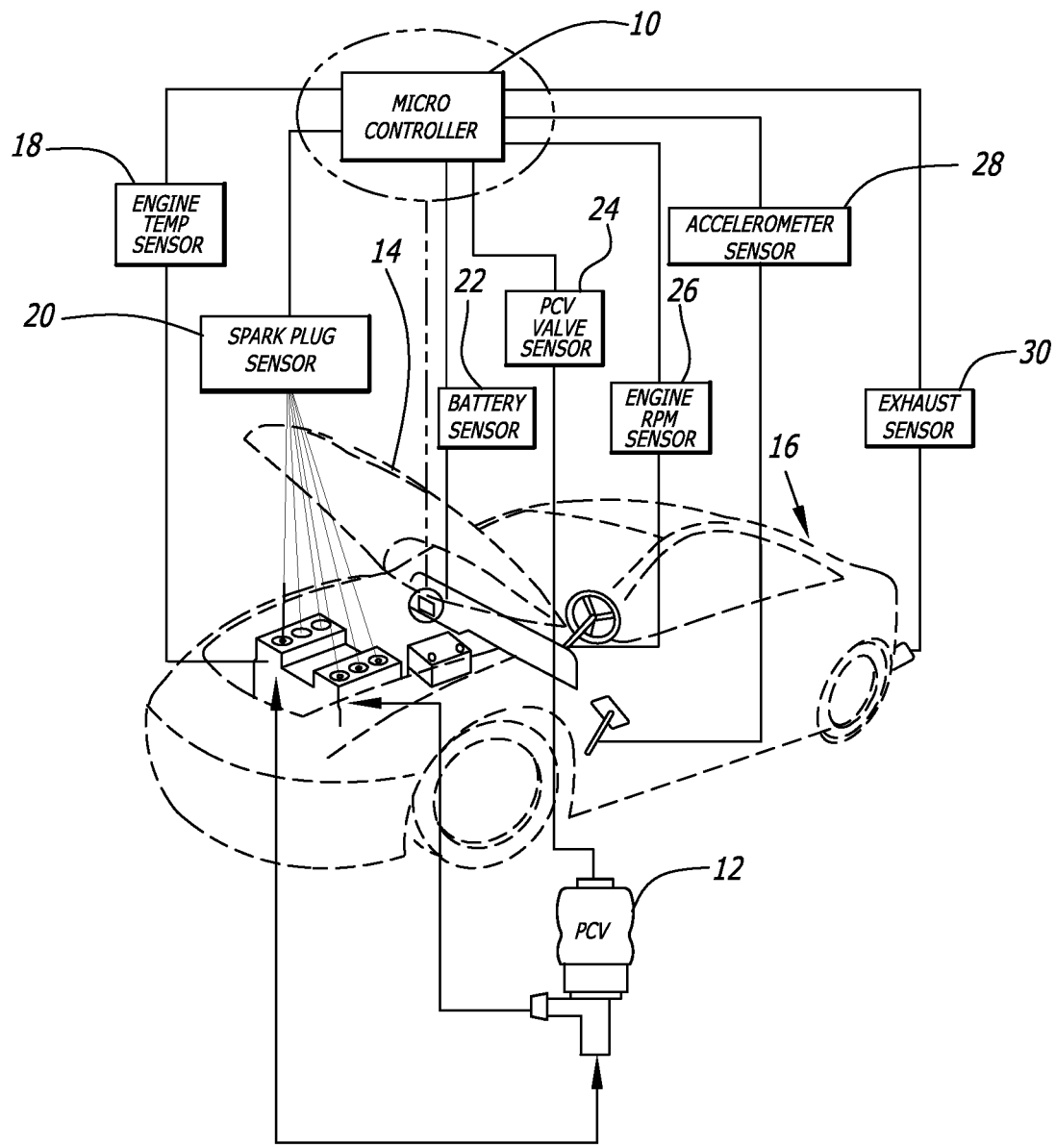
FIG. 1 is a schematic of a car engine, illustrating the microcontroller connected to multiple engine sensors and a PCV valve.

As shown in the drawings for purposes of illustration, a microcontroller for a pollution control system is referred to generally by the reference number 10. In FIG. 1, the microcontroller 10 is preferably mounted under a hood 14 of an automobile 16. The microcontroller 10 is electrically coupled to one or more of a plurality of sensors that monitor and measure real-time operating conditions and performance of the automobile 16. The microcontroller 10 regulates the flow rate of blow-by gases by regulating the engine vacuum in a combustion engine through digital control of a PCV valve 12. The microcontroller 10 receives real-time input from sensors that might include an engine temperature sensor 18, a spark plug sensor 20, a battery sensor 22, a PCV valve sensor 24, an engine RPM sensor 26, an accelerometer sensor 28, and an exhaust sensor 30. Data obtained from the sensors 18, 20, 22, 24, 26, 28, and 30 by the microcontroller 10 is used to regulate the PCV valve 12, as described in more detail below.

Figure 2:
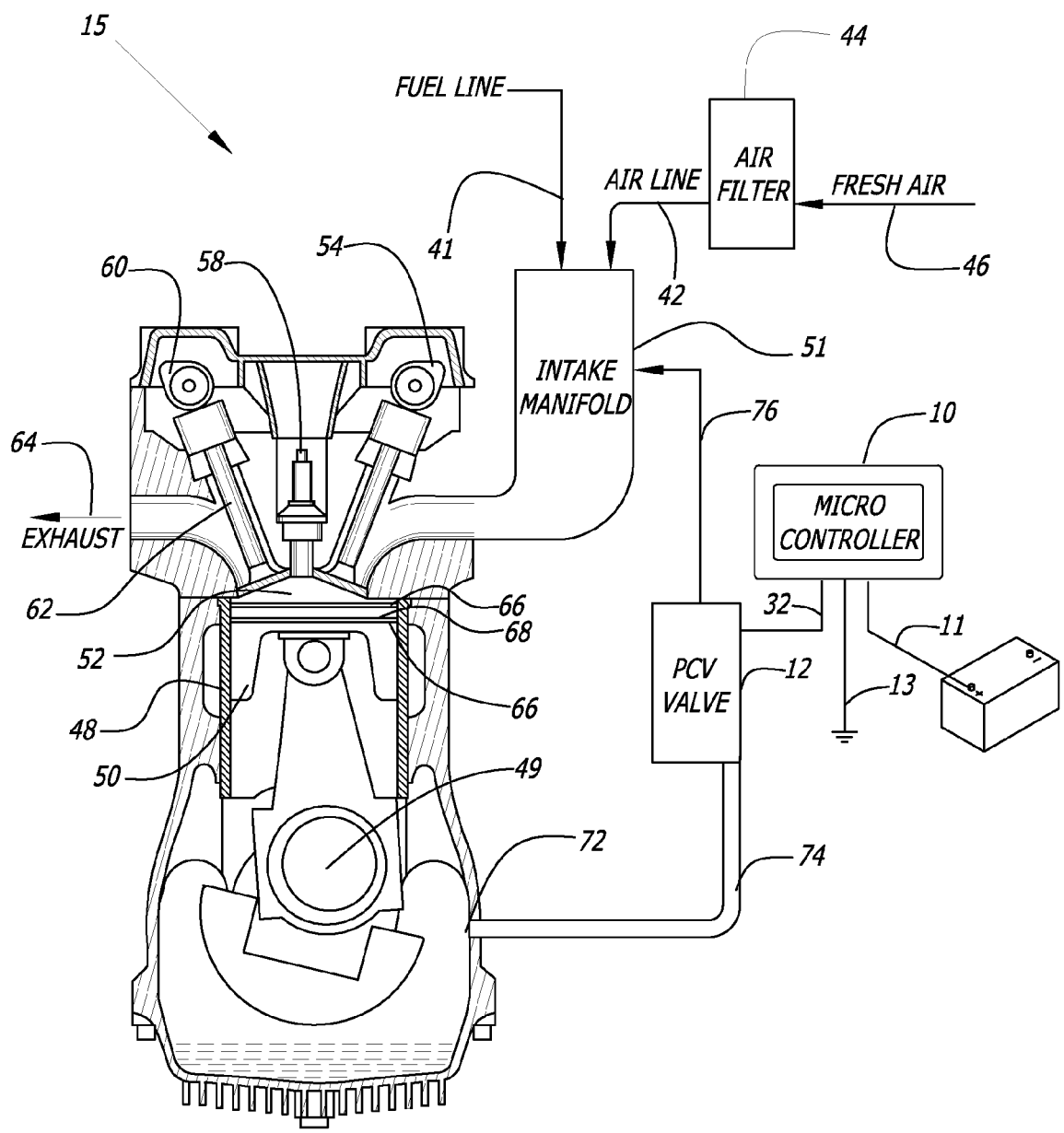
FIG. 2 is a side view of an internal combustion engine with a PCV valve and the microcontroller, illustrating the connections between these components.

FIG. 2 is a schematic illustrating operation of the microcontroller 10 in conjunction with the PCV valve 12 in a car engine 15. As shown in FIG. 2, the PCV valve 12 is disposed between a crankcase 49, of an engine 15, and an intake manifold 51. In operation, the intake manifold 51 receives a mixture of fuel and air via a fuel line 41 and an air line 42, respectively. An air filter 44 may be disposed between the air line 42 and an air intake line 46 to filter fresh air before mixing with fuel in the intake manifold 51. The air/fuel mixture in the intake manifold 51 is delivered to a piston cylinder 48 as a piston 50 descends downward within the cylinder 48 from the top dead center. This creates a vacuum within a combustion chamber 52. Accordingly, an input camshaft 54 rotating at half the speed of the crankshaft 49 is designed to open an input valve 56 thereby subjecting the intake manifold 51 to the engine vacuum. Thus, fuel/air is drawn into the combustion chamber 52 from the intake manifold 51.

The fuel/air in the combustion chamber 52 is ignited by a spark plug 58 (in a gasoline engine). The rapid expansion of the ignited fuel/air in the combustion chamber 52 causes depression of the piston 50 within the cylinder 48. After combustion, an exhaust camshaft 60 opens an exhaust valve 62 to allow escape of the combustion gases from the combustion chamber 52 out an exhaust line 64. Typically, during the combustion cycle, excess exhaust gases slip by a pair of piston rings 66 mounted in the head 68 of the piston 50. These "blow-by gases" enter the crankcase 49 as high pressure and temperature gases. Over time, harmful exhaust gases such as hydrocarbons, carbon monoxide, nitrous oxide and carbon dioxide can condense out from a gaseous state and coat the interior of the crankcase 49 and mix with the oil 70 that lubricates the mechanics within the crankcase 49. But, the PCV valve 12 is designed to vent these blow-by gases from the crankcase 49 to the intake manifold 51 to be recycled as fuel for the engine 15. This is accomplished by using the pressure differential between the crankcase 49 and the intake manifold 51. In operation, the blow-by gases exit the relatively higher pressure crankcase 49 through a vent 72 and travel through a vent line 74, the PCV valve 12, a blow-by return line 76 and into a relatively lower pressure intake manifold 51 coupled thereto. Accordingly, the quantity of blow-by gases vented from the crankcase 49 to the intake manifold 51 via the PCV valve 12 is digitally regulated by the microcontroller 10, which is connected to the PCV valve via connection wires 32. The microcontroller 10 is powered by a battery 11 and grounded at the ground connection 13.

Figure 3:
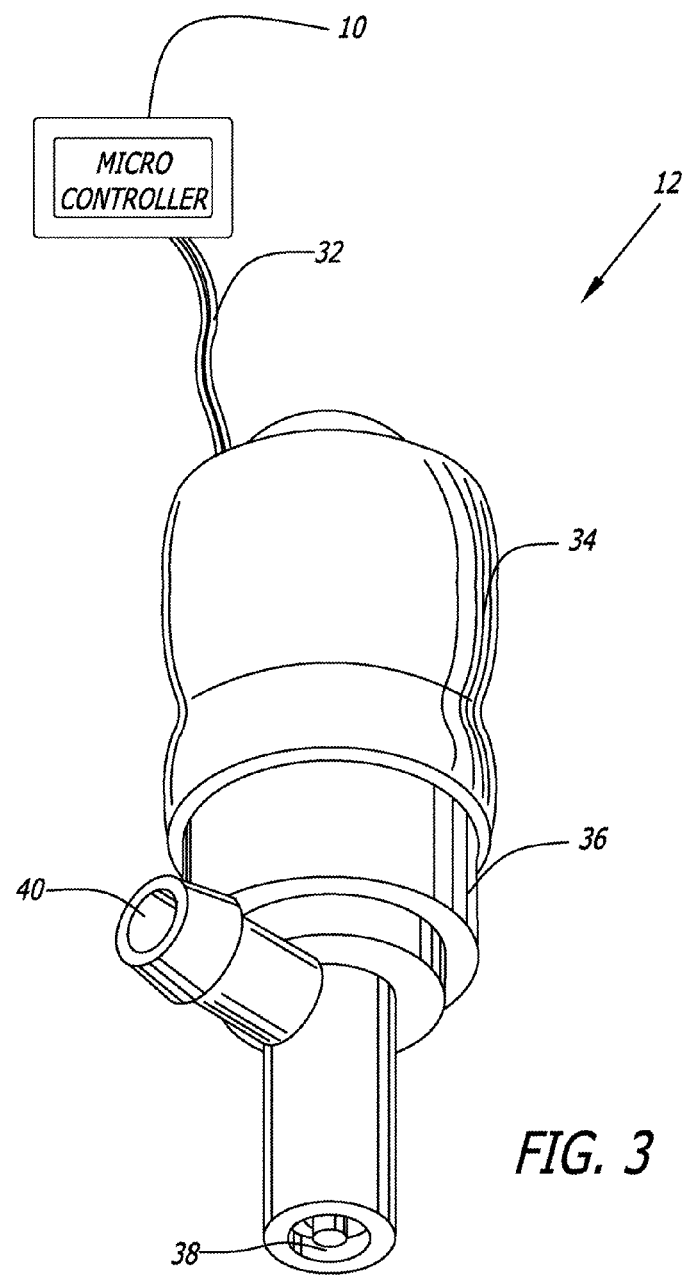
FIG. 3 is a perspective view of a PCV valve illustrating the connection between the PCV valve and the microcontroller.

The PCV valve 12 in FIG. 3 is generally electrically coupled to the microcontroller 10 via electrical connection 32. The microcontroller 10 at least partly regulates the quantity of blow-by gases flowing through the PCV valve 12 via the electrical connections 32. In FIG. 3, the PCV valve 18 includes a rubber housing 34 that encompasses a portion of a rigid outer housing 36. The connector wires 32 extend out from the outer housing 36 via an aperture therein (not shown). Preferably, the outer housing 36 is unitary and comprises an intake orifice 38 and an exhaust orifice 40. In general, the microcontroller 10 operates a restrictor internal to the outer housing 36 for regulating the rate of blow-by gases entering the intake orifice 38 and exiting the exhaust orifice 40.

The operational characteristics and production of blow-by is unique for each engine and each automobile in which individual engines are installed. The PCV valve 12 is capable of being installed in the factory or post production to maximize automobile fuel efficiency, reduce harmful exhaust emissions, recycle oil and other gas and eliminate contaminants within the crankcase. The purpose of the PCV valve 12 and microcontroller 10 is to strategically vent the blow-by gases from the crankcase 49 into the intake manifold 51 based on blow-by production. Accordingly, the microcontroller 10 digitally regulates and controls the PCV valve 12 based on engine speed and other operating characteristics and real-time measurements taken by the sensors 18-30. Importantly, the PCV valve 12 and microcontroller 10 is adaptable to any internal combustion engine. For example, the PCV valve 12 and microcontroller 10 may be used with gasoline, methanol, diesel, ethanol, compressed natural gas (CNG), liquid propane gas (LPG), hydrogen, alcohol-based engines, or virtually any other combustible gas and/or vapor-based engine. This includes both two and four stroke IC engines and all light, medium and heavy duty configurations. The PCV valve 12 and microcontroller 10 may also be integrated into immobile engines used to produce energy or used for other industrial purposes.

In particular, venting blow-by gases based on engine speed and other operating characteristics of an automobile decreases the quantity of hydrocarbons, carbon monoxide, nitrogen oxide and carbon dioxide emissions. The PCV valve 12 and microcontroller 10 recycle gases by burning them in the combustion cycle. No longer are large quantities of the contaminants expelled from the vehicle via the exhaust. Hence, when installed in an automobile engine, the PCV valve 12 and microcontroller 10 are capable of reducing air pollution emissions for each automobile, increasing gas mileage per gallon, increasing horsepower performance, reducing engine wear (due to low carbon retention) and dramatically reducing the number of oil changes required. Considering that the United States consumes approximately 870 million gallons of petroleum a day, even a small reduction in petroleum use through the recycling of blow-by gases translates into significant savings of petroleum. Worldwide, nearly 3.3 billion gallons of petroleum are consumed per day, so just a small reduction of petroleum use worldwide could save millions of gallons of fossil fuels.

Figure 4:
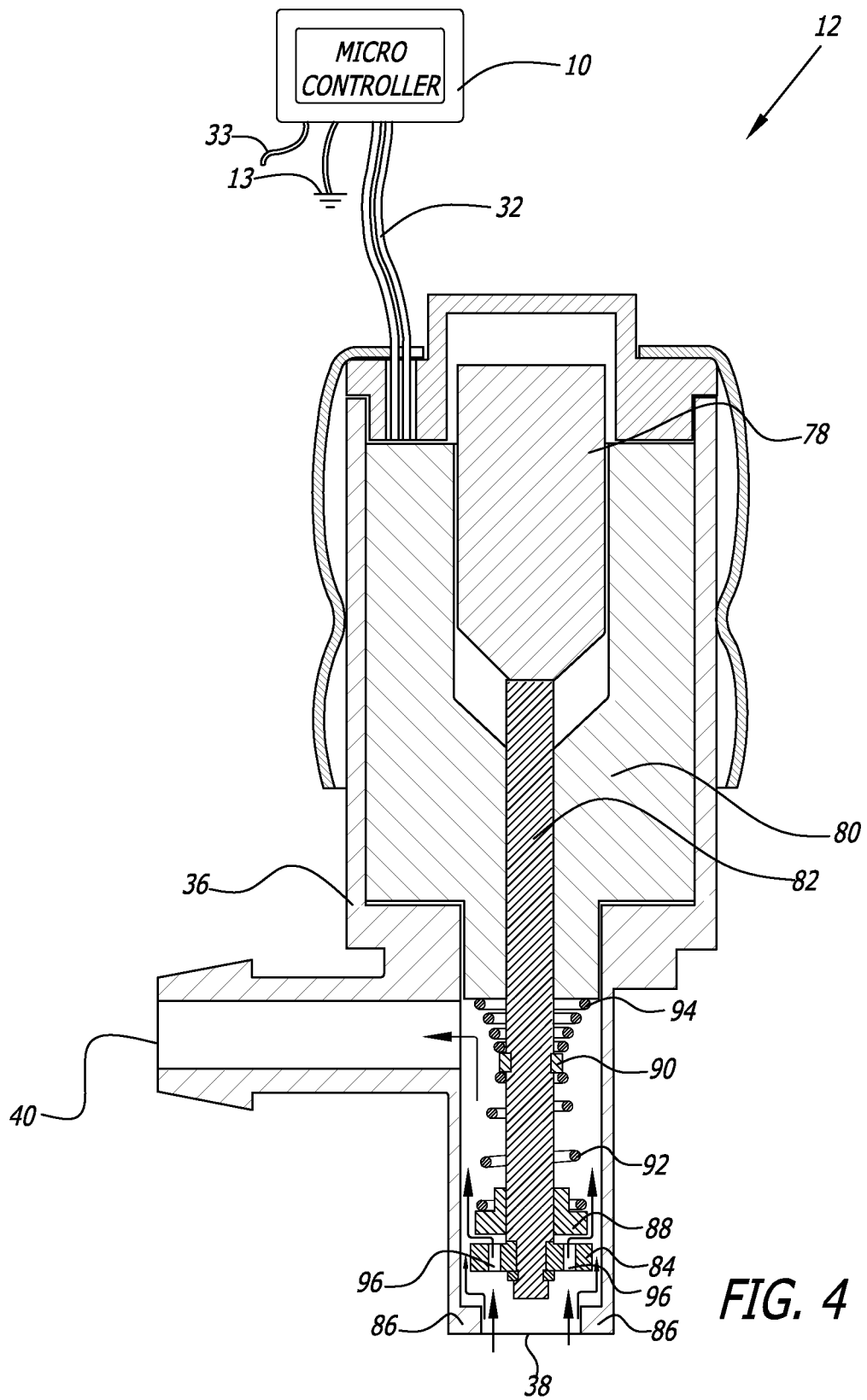
FIG. 4 is a side cut-away view of a PCV valve illustrating the functionality of the PCV valve.

The PCV valve 12 is shown in a cut-away side view in FIG. 4. Here, the general operation of the PCV valve 12 is illustrated. The microcontroller 10 is connected to the PCV valve 12 via the connection wires 32. The microcontroller 10 receives input signals via input wire 33 and is grounded via ground connection 13. In use, the microcontroller 10 powers a solenoid 80 housed within the PCV valve 12. The solenoid 80 is cylindrical and surrounds a plunger 78. When the electrical power is supplied to the solenoid 80, a magnetic field is created within the solenoid 80. The plunger 78 is magnetic as well and interacts with the solenoid 80 depending on the strength of the magnetic field created therein. When there is no electrical power supplied to the solenoid 80, the plunger 78 disengages with the interior of the solenoid 80 thereby sliding out of the interior of the solenoid 80 (as shown). As an increasing amount of electrical power is supplied to the solenoid 80, the plunger 78 is drawn farther into the interior of the solenoid 80 until it is fully engaged with the interior of the solenoid 80.

The PCV valve 12 also includes features that allow continued functionality in the event of loss of power from the microcontroller 10. The plunger 78 is fitted with a rod 100 that extends out of the solenoid 80 toward the intake orifice 38. The rod 100 has a front disk 84 that is locked in place, and a rear disk 88 that slides on the rod 100. A snap ring 90 is attached to the rod 100 in between a rear spring 94 and a front spring 92. The front spring 92 is preferably a coil spring that decreases in diameter from the intake orifice 38 toward the snap ring 90. The diameter of the front spring 92 should be approximately or slightly less than the diameter of the snap ring 90. The snap ring 90 engages the front spring 92 on one side and the rear spring 94 on the other side. Like the front spring 92, the rear spring 94 tapers from a wider diameter near the solenoid 80 to a diameter approximately the size of, or slightly smaller than, the diameter of the snap ring 90. The rear spring 94 is preferably a coil spring and wedged between the solenoid 80 and the snap ring 90. In this configuration the rear disk 88 is held in place against the front disk 84 by the pressure exerted on it from the front spring 92.

The front disk 84 and rear disk 88 govern the quantity of blow-by gases entering the intake orifice 38 and exiting the exhaust orifice 40. When the magnetic field in the solenoid 80 is increased, the plunger 78 is drawn into the solenoid 80, thereby advancing the rod 82 toward the intake orifice 38.

When the plunger 78 is fully engaged in the solenoid 80, the front disk 84 is pressed against the intake orifice 38, such that the intake orifice 38 is effectively blocked by the front disk 84. The front disk 84 has apertures 96. When the rear disk 88 is pressed against the front disk 84 by the front spring 92, the apertures 96 are blocked by the rear disk 88. With the front disk 84 pressed against the intake orifice, and the rear disk 88 pressed against the front disk 84, blow-by gases are blocked from entering and passing through the PCV valve 12. But the force of the front spring 92 is not so great that it cannot be overcome by sufficient pressure through the intake orifice 38. Under sufficient vacuum pressure from the crankcase 49 and the intake manifold 51, the rear disk 88 is pushed away from the front disk 84 thereby un-blocking the apertures 96 in the front disk 84. With the apertures 96 unblocked, a small amount of blow-by gas may pass through the PCV valve 12. This functionality is basically an OEM default that allows the PCV valve 12 to continue to function when the solenoid is not operational.

Optimized PCV valve functionality occurs when the microcontroller 10 powers the solenoid 80 such that the front disk 84 is drawn away from the intake orifice 38, as shown in FIG. 4. Here, blow-by gases are allowed to enter and exit the PCV valve 12 along the directional arrows through intake orifice 38. If the vacuum pressure is substantial, the rear disk 88 may be drawn away from the front disk 84 such that the apertures 96 are also unblocked. In this configuration, a maximum amount of blow-by gases may pass through the PCV valve 12. Improved gas mileage, decreased pollution, and optimal engine performance are achieved as the microcontroller 10 powers the solenoid 80 so that appropriate levels of blow-by gas enter the intake orifice 38 according to several determining factors within the engine.

As stated above, the microcontroller 10 of the present invention receives signals from engine sensors 18-30 (see FIG. 1). The microcontroller 10 uses these signals in order to control the PCV valve 12 to achieve optimal engine efficiency and pollution control. The microcontroller 10 is illustrated more particularly in FIGS. 5 and 5A. The microcontroller 10 is connected to the PCV valve 12, engine sensors 18-30, and a power source (not shown in this view) by a series of electrical connections. As shown in FIG. 5, the PCV valve 12 is first connected to a wire harness 98. In use, the PCV valve 12 intake orifice 38 would be plumbed to the vent line 74 from the crankcase 49 (see FIG. 2). The PCV valve 12 exhaust orifice 40 is plumbed to the blow-by return line 76 (see FIG. 2). The PCV valve 12 is controlled via the connection wires 32. The connection wires 32 attached to the wire harness 98 via a female two-port connector 106. The wire harness 98 has a corresponding male two-port connector 102 that is secured to the female two-port connector 106 of the PCV valve 12 connection wires 32 by a connector lock 116 and notch 120. The connector lock 116 and notch 120 hold the male 102 and female 106 portions of the two-port connector firmly in place. This is important in the severe environment found within a car engine 15 (FIG. 1), where high temperatures, lower temperatures, extreme vibrations and jarring, as well as chemical fumes and residue may all be encountered.

The wire harness 98 serves to connect the PCV valve 12 to the microcontroller 10 and a power source. The end of the wire harness 98 nearest the PCV valve 12 also includes a signal wire 118. The signal wire 118 is included here so that it will be nearest the car engine 15 (FIG. 1). In an external coil ignition system, the signal wire 118 always connects to the negative coil post (not shown). In an internal coil ignition system, the signal wire 118 always connects to the ground post on the internal ignition coil (not shown). The connection between the signal wire 118 and either the negative coil post or the ground post on the internal ignition coil provides an electrical ground for the microcontroller 10.

The microcontroller 10 is connected to the wire harness 98 via control wires 110 and a female four-port connector 108. In the preferred embodiment, there are four control wires 110 which are multicolored. The control wires 110 generally comprise the signal wire 118, a wire to power and control the PCV valve 12, a positive electrical wire 112 from the power source (not shown), and a negative electrical wire 114 from the power source (not shown). These wires allow the microcontroller 10 to be powered and communicate with the rest of the system. As with the two-port connector above, the male 104 and female 108 four-port connectors are held together by a connector lock 116 and notch 120.

The wire harness 98 also connects to a power source (not shown) via a power supply harness 100. The power supply harness 100 includes a male two-port connector 102 that connects a positive electrical lead 112 and a negative electrical lead 114 to the wire harness 98. In the preferred embodiment, the negative electrical lead 114 is connected to a ground within the engine. The positive electrical lead 112 is preferably connected to a 3 amp fuse which piggy backs over the 10 amp ignition fuse in the car engine (not shown). This means that the microcontroller 12 and PCV valve 12 are powered only when the car ignition is turned on. As with the other port connectors, the male 102 and female 106 two-port connectors are held together by a connector lock 116 and notch 120.

FIG. 5A is taken from box 5A of FIG. 5 and illustrates the microcontroller 10 and control wires 110 in greater detail. In this view, it is also possible to see the LED 124, and optional inputs 122. The LED 124 is included to provide a user with information about what phase the microcontroller 10 is in. The LED 124 flashes in multiple colors (preferably red and blue) and can flash in different patterns and rhythms. The optional inputs 122 are provided to receive extra inputs from other engine sensors. The optional inputs 122 may also be used to re-flash the microcontroller 10 with new programming. The microcontroller 10 generally comprises logic and solid state memory. The solid state memory can be flashed and re-flashed to update programming and add new features to the microcontroller 10. This makes updates and upgrades to the current system fast and easy.

After installation of the PCV valve 12, the microcontroller 10 and all the other connections, the on-board computer of the car 16 must be reset. This is done by disconnecting the negative side of the car battery (not shown) for four minutes and releasing the energy from the electrical system by tapping the car brakes four times. Once this is done, the car 16 can be started and the installation can be checked. This is done by watching the LED 124 on the microcontroller 10. The first time a car is started is called the "cold start". During the first two minutes of the cold start the LED 124 will be red with a blue flash every two seconds to show the PCV valve 12 is working correctly. During the second two minutes, the LED 124 will remain red with a blue flash every two RPMs of the engine 15. This will continue for another two minutes, showing that the timing sequences in the microcontroller 10 are working properly. Following this, the LED 124 will glow solid red, which a blue flash indicating the PCV valve 12 and microcontroller 10 are activated. When the engine reaches the required RPMs, the LED 124 will turn to a blue flash only, indicating that the PCV valve 12 and microcontroller 10 are modulating at all levels of demand.

In operation, the microcontroller 10 functions in three states. First, upon ignition of the vehicle, a cold start state, the microcontroller 10 causes the solenoid 80 in the PCV valve 12 to stay closed, as described above. This is because the engine 15 of the vehicle produces large quantities of pollution while still heating up. Once the engine 15 is properly heated, a warm running state, it functions more efficiently and produces less pollution. At that point, the microcontroller 10 enters the next state and functions as a window switch based on the engine RPMs. While the engine is operating with a certain RPM range, the microcontroller 10 causes the solenoid 80 in the PCV valve 12 to open. Once the engine falls out of that RPM range, the solenoid 80 in the PCV valve 12 closes again. If the vehicle is being driven in conditions where the RPMs stay in the given window or range for long periods of time (i.e. highway driving), then the microcontroller 10 switches to the third state and activates a timing sequence so the vehicle's on-board diagnostics is prevented from introducing too much fuel into the engine. This timing sequence can be programmed to any predetermined time interval, but in the preferred embodiment the sequence causes the solenoid 80 in the PCV valve 12 to be open for two minutes, then closed for 10 minutes. This sequence is repeated indefinitely until the engine RPMs fall out of the given range.

While the logic of the preferred embodiment of the microcontroller 10 is based primarily on engine RPMs, other embodiments of the microcontroller 10 may have logic based on other criteria. Such criteria may be engine temperature and engine torque, as well as crankcase pressure. Basing the microcontroller logic on these additional criteria makes for a control system that is more adjustable and programmable.

Although several embodiments have been described in detail for purposes of illustration, various modifications may be made to each without departing from the scope and spirit of the invention. Accordingly, the invention is not to be limited, except as by the appended claims.

What is claimed is:

1. A pollution control system for an internal combustion engine, comprising:
   a microcontroller electrically connected to a power supply;
   a plurality of sensors connected to the microcontroller, each of the plurality of sensors configured to measure operating parameters of the engine including engine temperature and engine RPMs; and
   a PCV valve electrically connected to the microcontroller and responsive to a control signal therefrom, for regulating a flow rate of blow-by gases in the engine; and
   wherein the microcontroller has three operating states, comprising:
   a first operating state corresponding to an engine condition between ignition and the engine temperature reaching a preferred idle/operation temperature, wherein the microcontroller closes the valve;
   a second operating state corresponding to an engine condition after the engine temperature reaches the preferred idle/operation temperature wherein the microcontroller opens the PCV valve when the engine RPMs are within a predefined low/hi window of RPMs; and
   a third operating stare corresponding to an engine condition after the engine temperature reaches the preferred idle/operation temperature and the RPMs have been in the predefined low/hi window of RPMs for a predetermined duration wherein the microcontroller periodically opens and closes the PCV valve as long as the RPMs are in the redefined low-hi window.

2. The system of claim 1, wherein the PCV valve is moveable between opened and closed positions so as to regulate vacuum pressure in the engine.

3. The system of claim 1, wherein the plurality of sensors include an engine temperature sensor, a spark plug sensor, a battery sensor, a PCV valve sensor, an engine RPM sensor, an accelerometer sensor, or an exhaust gas sensor.

4. The system of claim 1, wherein the microcontroller includes a signal wire, a PCV control wire, and power supply wires.

5. The system of claim 1, wherein the microcontroller is powered only when an ignition for the engine is on.

6. The system of claim 1, wherein the microcontroller comprises solid state memory that is programmable and reprogrammable.

7. The system of any of claims 1-6, wherein the PCV valve is in fluid communication with a crankcase and an intake manifold on the engine.

8. The system of claim 7, wherein the microcontroller operates a restrictor within the PCV valve, for regulating the flow rate of blow-by gases through the PCV valve.

9. The system of claim 7, wherein the microcontroller regulates the flow rate of blow-by gases from the crankcase to the intake manifold based on the quantity of blow-by gases being produced.

10. The system of claim 9, wherein the microcontroller determines the quantity of blow-by gases being produced based upon the operating parameters of the engine measured by the sensors.

11. The system of claim 1, wherein the microcontroller comprises:
   programmable flash memory connected to a control processor;
   a power supply input connected to the memory and the control processor;
   a sensor input connected to the control processor, wherein the sensor input is configured to receive data from an engine sensor; and
   a signal output connected to the control processor, wherein the signal output transmits a signal from the control processor so as to control operation of a PCV valve that regulates a flow rate of blow-by gases in the engine.

12. The system of claim 11, wherein the control processor is configured to send multiple operating signals through the signal output.

13. The system of claim 12, wherein a first operating signal corresponds to the first operating state a second operating signal corresponds to the second operating state, and a third operating signal corresponds to the third operating state.

14. The system of any of claims 11-13, wherein the engine sensor is configured to transmit data on engine RPMs, engine temperature, engine torque, or crankcase pressure.

* * * * *

UNITED STATES PATENT AND TRADEMARK OFFICE
CERTIFICATE OF CORRECTION

PATENT NO. : 9,316,164 B2
APPLICATION NO. : 14/156189
DATED : April 19, 2016
INVENTOR(S) : Serge V. Monros It is certified that error appears in the above-identified patent and that said Letters Patent is hereby corrected as shown below:

In the Claims

In column 11, line 56 (Claim 1), delete "stare" and insert -- state --; and

In column 12, line 4 (Claim 1), delete "redefined" and insert -- predefined --.

Signed and Sealed this
Twenty-first Day of June, 2016

Michelle K. Lee
*Director of the United States Patent and Trademark Office*